(12) United States Patent
Huang et al.

(10) Patent No.: US 9,708,204 B2
(45) Date of Patent: Jul. 18, 2017

(54) MULTI-FUNCTION WATER TREATMENT CONTAINER FOR MAGNETIZING WATER

(71) Applicants: Hann Huang, Taichung (TW); Wei-Hsiang Huang, Taichung (TW); Chi-En Huang, Taichung (TW)

(72) Inventors: Hann Huang, Taichung (TW); Wei-Hsiang Huang, Taichung (TW); Chi-En Huang, Taichung (TW)

(73) Assignee: Hann Huang, Taichung (TW)

( * ) Notice: Subject to any disclaimer, the term of this patent is extended or adjusted under 35 U.S.C. 154(b) by 116 days.

(21) Appl. No.: 14/886,006

(22) Filed: Oct. 17, 2015

(65) Prior Publication Data

US 2017/0107124 A1    Apr. 20, 2017

(51) Int. Cl.
*C02F 1/48* (2006.01)
*C02F 1/00* (2006.01)

(52) U.S. Cl.
CPC .............. *C02F 1/482* (2013.01); *C02F 1/005* (2013.01); *C02F 2201/48* (2013.01); *C02F 2307/02* (2013.01)

(58) Field of Classification Search
CPC .......... C02F 1/003; C02F 1/005; C02F 1/482; C02F 1/48; C02F 2201/48; C02F 2307/02
See application file for complete search history.

(56) References Cited

U.S. PATENT DOCUMENTS

2005/0252844 A1* 11/2005 Chau ...................... C02F 1/003
                                                                    210/282

* cited by examiner

*Primary Examiner* — Lucas Stelling
(74) *Attorney, Agent, or Firm* — Yuwen Guo

(57) ABSTRACT

A multi-function water treatment container for magnetizing water comprises a base, a connection barrel, a son bottle body, a first magnetic element, a second magnetic element, a cap, and a mother bottle body. The N, S poles of the first magnetic element and the N, S poles of the second magnetic element are corresponding to each other and a repelling magnetic field is generated. When shaking the container, the water molecules may be affected by magnetic waves with low frequencies to make the water become the magnetizing and resonating water. The water molecules may become finer. After being cut by the magnetic fields and vibrating with the frequencies, the activity of the water may be enhanced and the molecule arrangement may be more orderly. Furthermore, the oxygen content, the solubility, and the permeability of the water molecules are enhanced substantially so as to being absorbed more easily by human body.

10 Claims, 10 Drawing Sheets

MULTI-FUNCTION WATER TREATMENT CONTAINER FOR MAGNETIZING WATER

FIELD OF THE INVENTION

The present invention relates to a water treatment, and more particularly to a multi-function water treatment container for magnetizing water.

BACKGROUND OF THE INVENTION

In general, the conventional activated water treatment device has large size or volume and is not capable for carrying. Besides, people sometimes carry medicines but forget to carry container for receiving water, or sometimes carry container for receiving water but forget to carry medicines. It often makes the life of health care worse.

Some people do not like drink pure water due to blank taste. Therefore, the enzyme, honey, coffee powder, or tea powder are needed to mixed with the pure water. However, they are still sometimes forgotten to carry and need a large space to carry. It is inconvenient for people.

In view of the foregoing circumstances, the inventor has invested a lot of time to study the relevant knowledge, compare the pros and cons, research and develop related products. After quite many experiments and tests, the "multi-function water treatment container for magnetizing water" of this invention is eventually launched to improve the foregoing shortcomings, to meet the public use.

SUMMARY OF THE INVENTION

An object of the present invention is to solve above mentioned problems and proves a multi-function water treatment container for magnetizing water. The N, S poles of the first magnetic element and the N, S poles of the second magnetic element are corresponding to each other and a repelling magnetic field is generated. When shaking the multi-function water treatment container of the present invention, the water molecules of the liquid (such as water) may be affected by magnetic waves with low frequencies to make the water become the magnetizing and resonating water. The water molecules may become finer. After being cut by the magnetic fields and vibrating with the frequencies, the activity of the water may be enhanced and the molecule arrangement may be more orderly. Furthermore, the oxygen content, the solubility, and the permeability of the water molecules are enhanced substantially so as to being absorbed more easily by human body. In other words, the magnetizing and resonating water may be quickly proceeded the physiological actions in organisms.

In addition, the son bottle body may be made by a material of stainless steel, food-grade plastic, Borosilicate glass, or nano-gold fine ceramic. Taking the Borosilicate glass material with high quality for example, it is easy to clean and the objects which are received therein may be clearly seen. It is more convenient for users.

Besides, the inner bottle may be arranged and fastened in the son bottle body so as to carry with the multi-function water treatment container 100 to prevent from forgetting to eat medicines.

Furthermore, besides the quality of the water may be improved, the effect of health preservation may be also improved. The water which is processed by the multi-function water treatment container 100 of the present invention may be mixed the tea powder, honey, or concentrated juice so as to enhance the pleasure and taste of the tea.

In order to achieve above objects, a multi-function water treatment container for magnetizing water is provided and comprises a base, having a connection groove arranged thereinside for providing an inner bottle body to detachably fasten; a connection barrel, having an inner convex ring formed thereinside, the connection barrel is located above the base and detachably screwed with the base; a son bottle body, having an outer convex ring formed at bottom thereof, a bottom surface of the outer convex ring is abutted against on the inner convex ring of the connection barrel, a seal ring is sleeved on the outer convex ring, the son bottle body is partially exposed above the connection barrel, a convex shoulder portion is extended from an outer surface of the son bottle body upwardly, and an abutting ring is formed the convex shoulder portion inwardly; a first magnetic element, arranged in the son bottle body, adjacent to the abutting ring of the convex shoulder portion, and under the abutting ring; a second magnetic element, arranged in the convex shoulder portion of the son bottle body and located above the abutting ring, and a fixing element is passing through the second magnetic element, the abutting ring, and a first magnetic element to fix together; a cap, sleeved to the convex shoulder portion of the son bottle body and located above the second magnetic element, an O-ring is sleeved to a lower edge of the cap so that the O-ring is interposed between a bottom surface of the cap and an outer surface of the son bottle body adjacent to an outer edge of the convex shoulder portion; and a mother bottle body, located above the connection barrel and detachably screwed with the connection barrel, a bottom ring portion of the mother bottle body is abutted against above the seal ring, the mother bottle body is covered the son bottle body, the first magnetic element, and the second magnetic element; wherein the inner bottle body is passing through the connection barrel and located in the son bottle body.

The container may further comprise an outer bottom cover and a marking ring. The outer bottom cover is covered to the bottom of the base. The marking ring is rotatably sleeved to the base and interposed between the connection barrel and the outer bottom cover. A date scale is marked at an outer surface of the connection barrel adjacent to the marking ring, and a week scale is marked at an outer surface of the marking ring.

The container may further comprise a bottle cover. The bottle cover is detachably screwed with a top portion of the mother bottle body.

In some embodiments, the connection groove is a step structure and at least has a first step groove portion and a second step groove portion, a diameter of the first step groove portion is larger than a diameter of the second step groove portion, the first step groove portion is located above the second step groove portion, and the first step groove portion and the second step groove portion are provided for plugging and fastening the inner bottle body with various sizes.

In some embodiments, the son bottle body is made by a material of stainless steel, food-grade plastic, Borosilicate glass, or nano-gold fine ceramic.

In some embodiments, the cap is made by a material of stainless steel, food-grade plastic, or nano-gold fine ceramic.

In some embodiments, a plurality of axial grooves is spaced apart angularly and formed at an outer edge of the cap, and a protruding portion is formed between two adjacent axial grooves.

In some embodiments, two third magnetic elements are arranged at each of the protruding portion.

In some embodiments, the fixing element includes a screw bolt, a washer, and a screw nut, the screw bolt is located above the second magnetic element arranged in the convex shoulder portion and passing through the second magnetic element, the abutting ring, and the first magnetic element downwardly, the washer is sleeved to the screw bolt from the bottom of the first magnetic element, the screw nut is located under the washer and screwed with the screw bolt so as to fasten the second magnetic element, the abutting ring, the first magnetic element, and the washer.

The various objectives and advantages of the present invention will be more readily understood from the following detailed description when read in conjunction with the appended drawing.

DESCRIPTION OF THE PREFERRED EMBODIMENT

Figure 1:
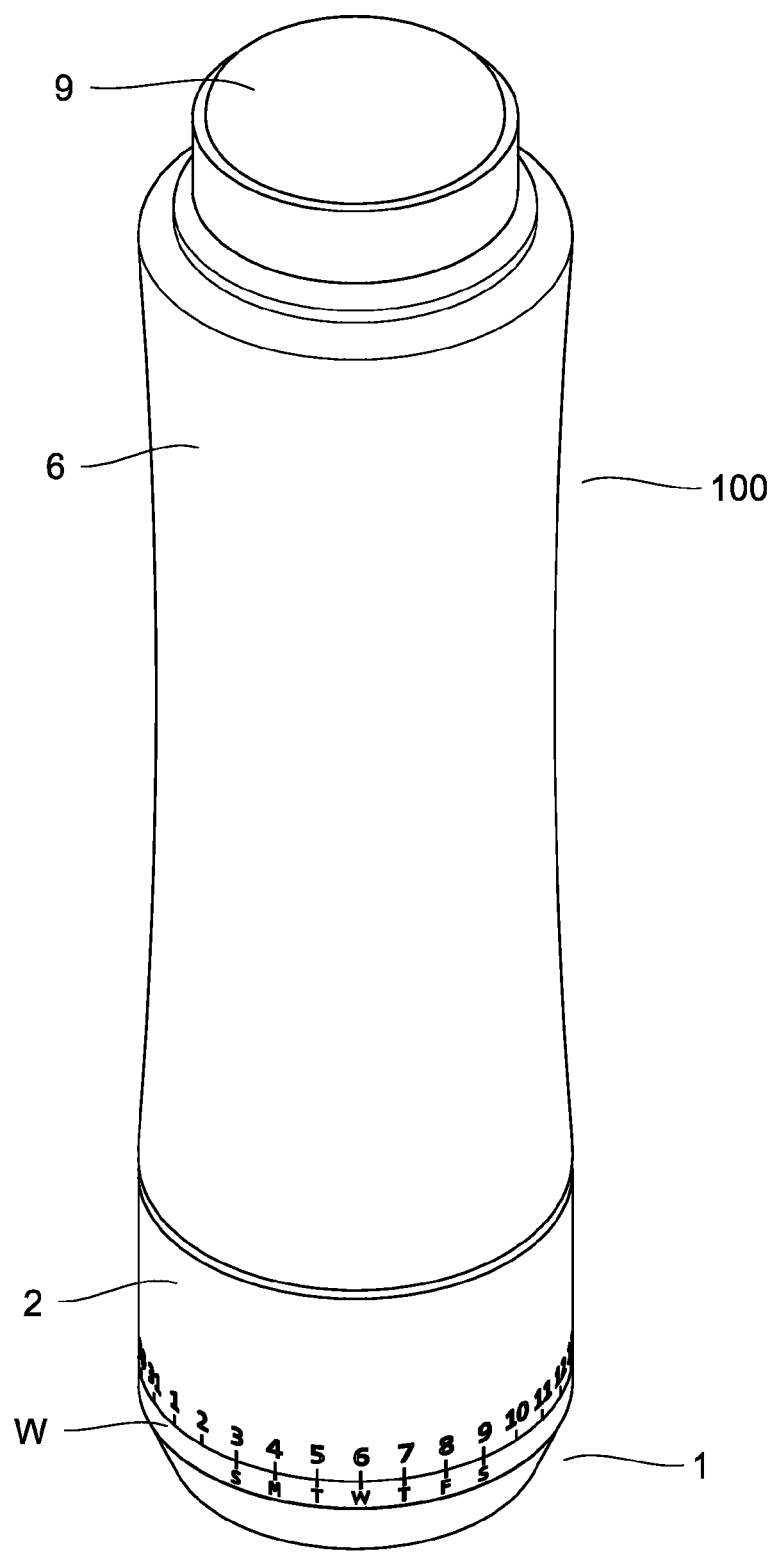
FIG. 1 is an outside view of a first embodiment of a multi-function water treatment container for magnetizing water of the present invention.
Figure 2:
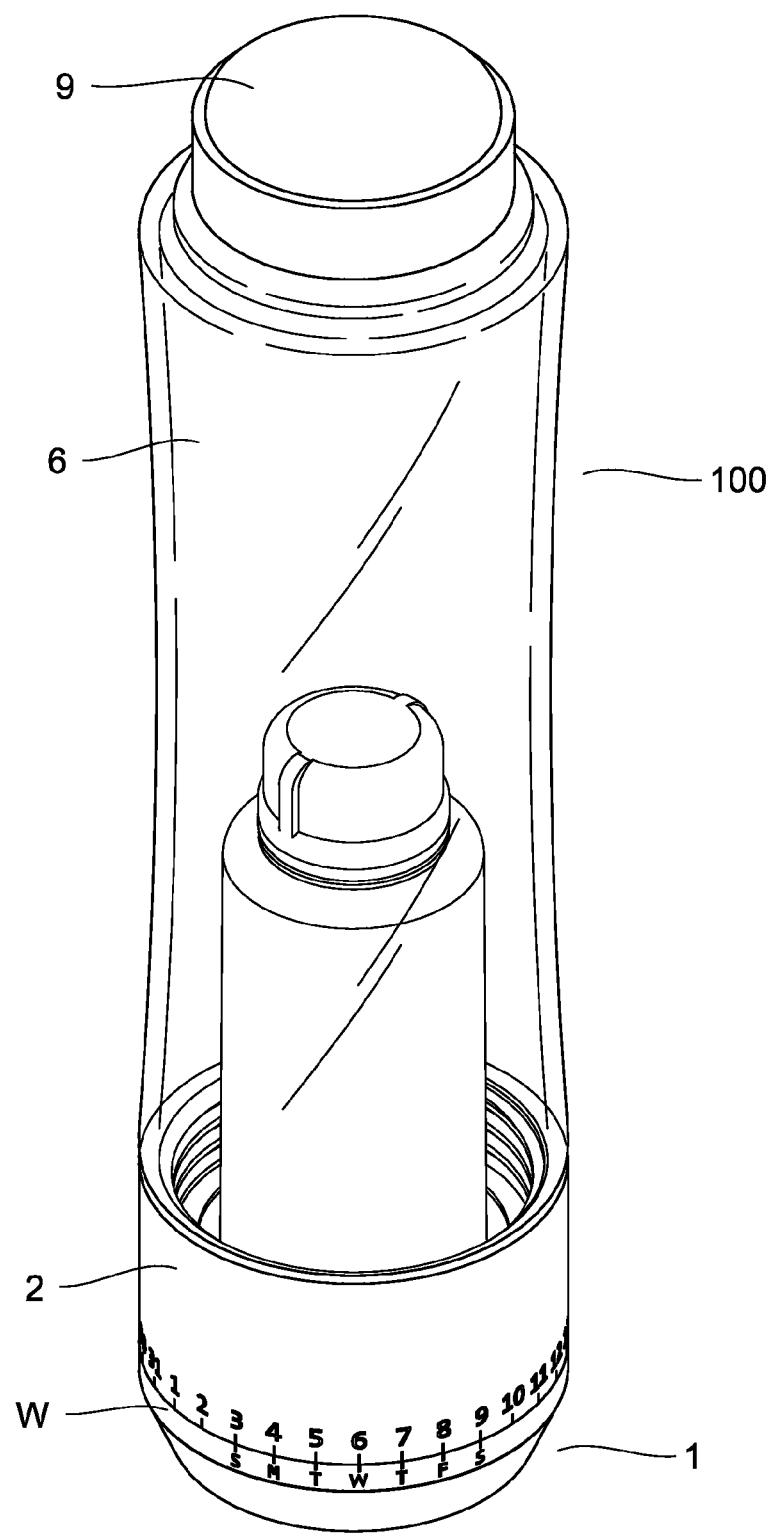
FIG. 2 is a perspective view of the first embodiment of the multi-function water treatment container for magnetizing water of the present invention.
Figure 3:
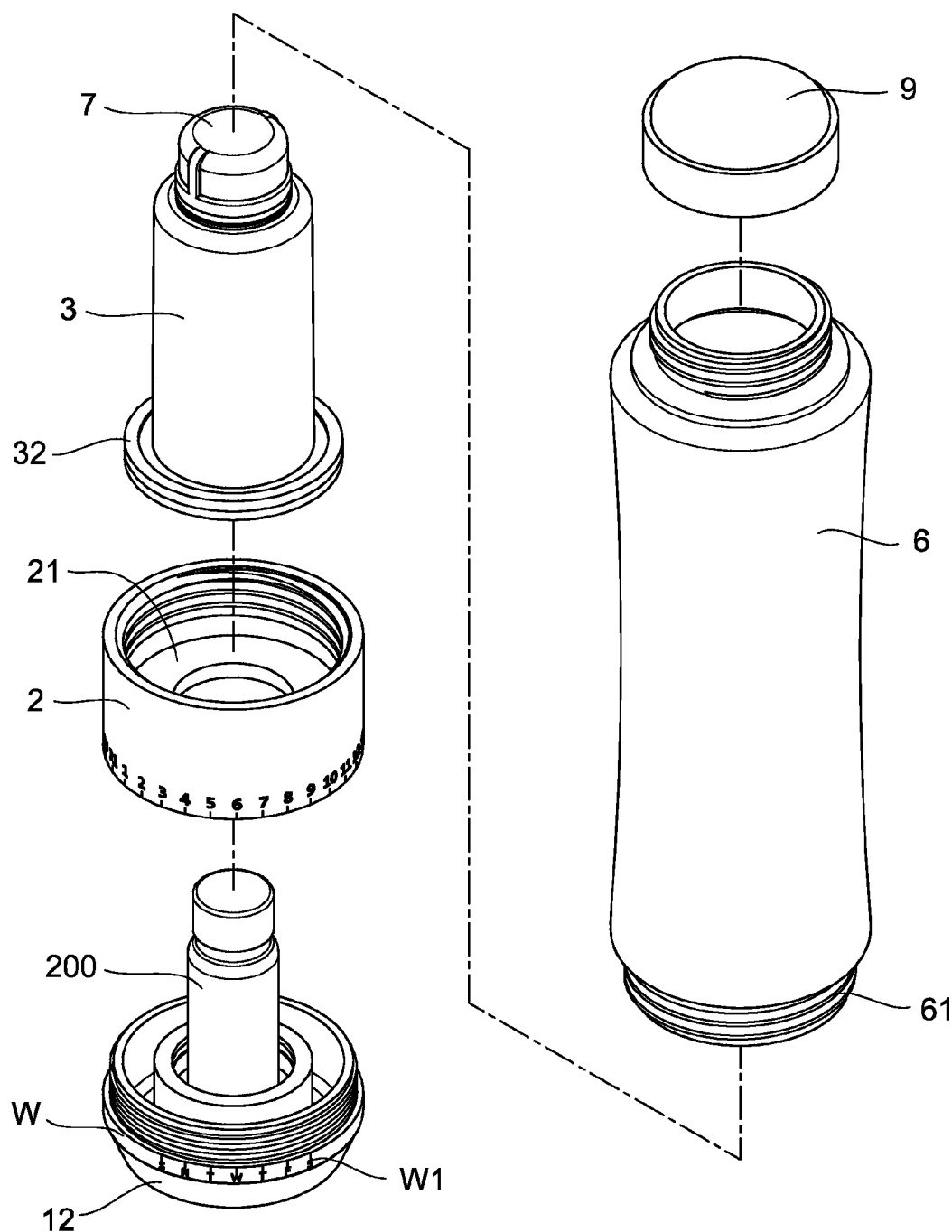
FIG. 3 is a partial exploded view of the first embodiment of the multi-function water treatment container for magnetizing water of the present invention.
Figure 4:
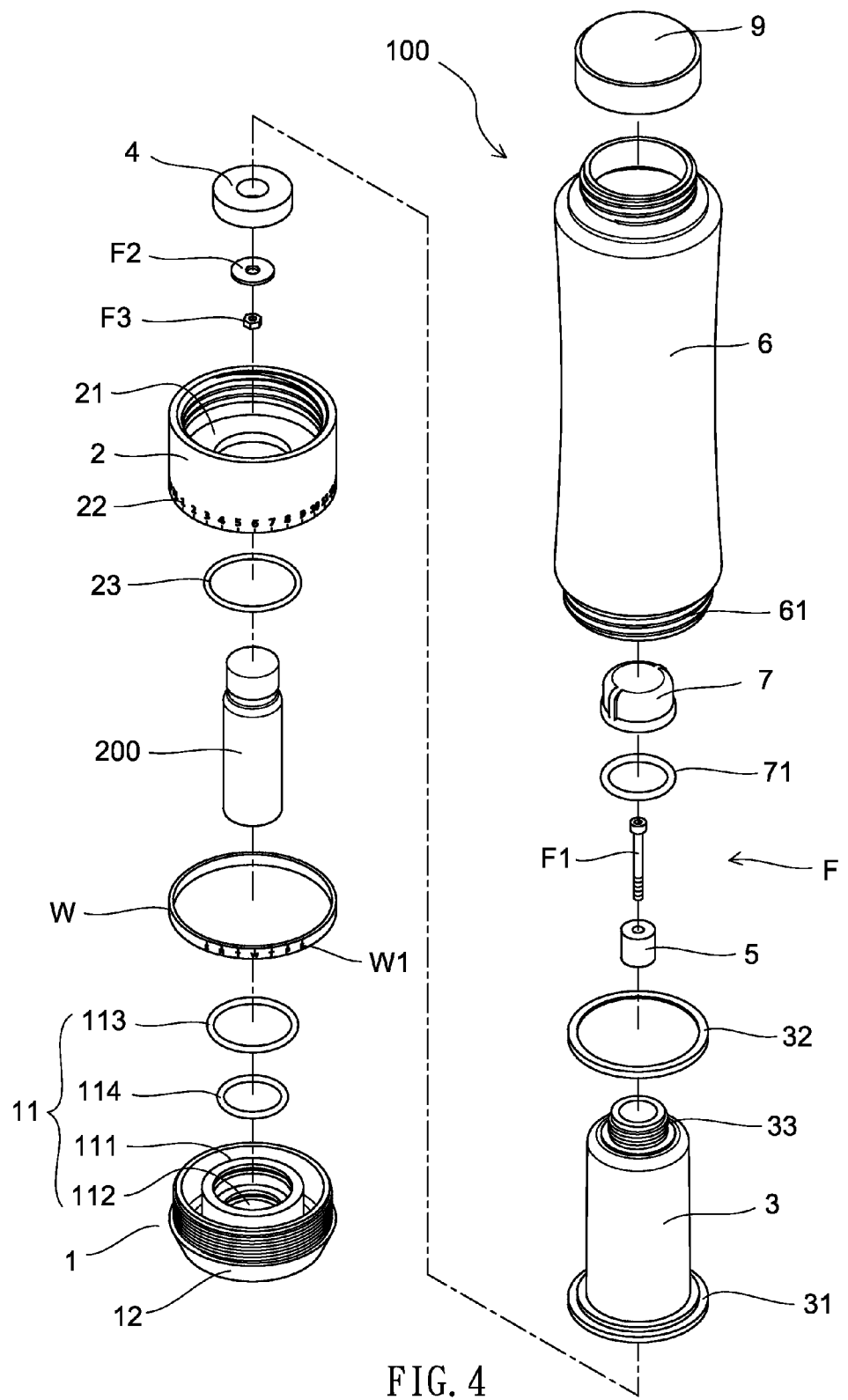
FIG. 4 is an exploded view of the first embodiment of the multi-function water treatment container for magnetizing water of the present invention.
Figure 5:
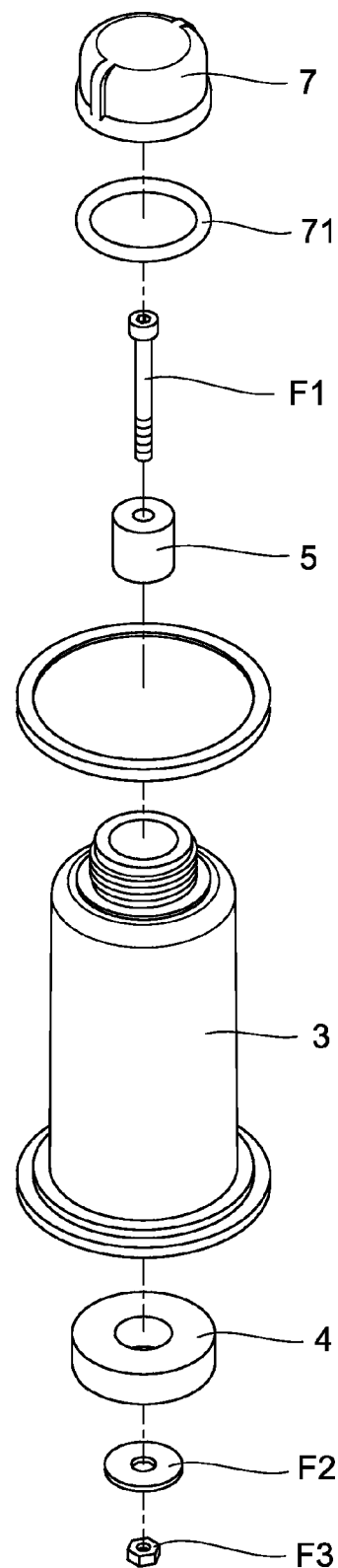
FIG. 5 is an exploded view of a son bottle body of the first embodiment of the multi-function water treatment container for magnetizing water of the present invention.

To describe clearly that the present invention achieves the foregoing objective and function, the technical features and desired function are described with reference to a preferred embodiment and accompanying drawings.

Please refer to FIGS. 1 to 10, the multi-function water treatment container 100 for magnetizing water comprises a base 1, a connection barrel 2, a son bottle body 3, a first magnetic element 4, a second magnetic element 5, and a mother bottle body 6.

Figure 6:
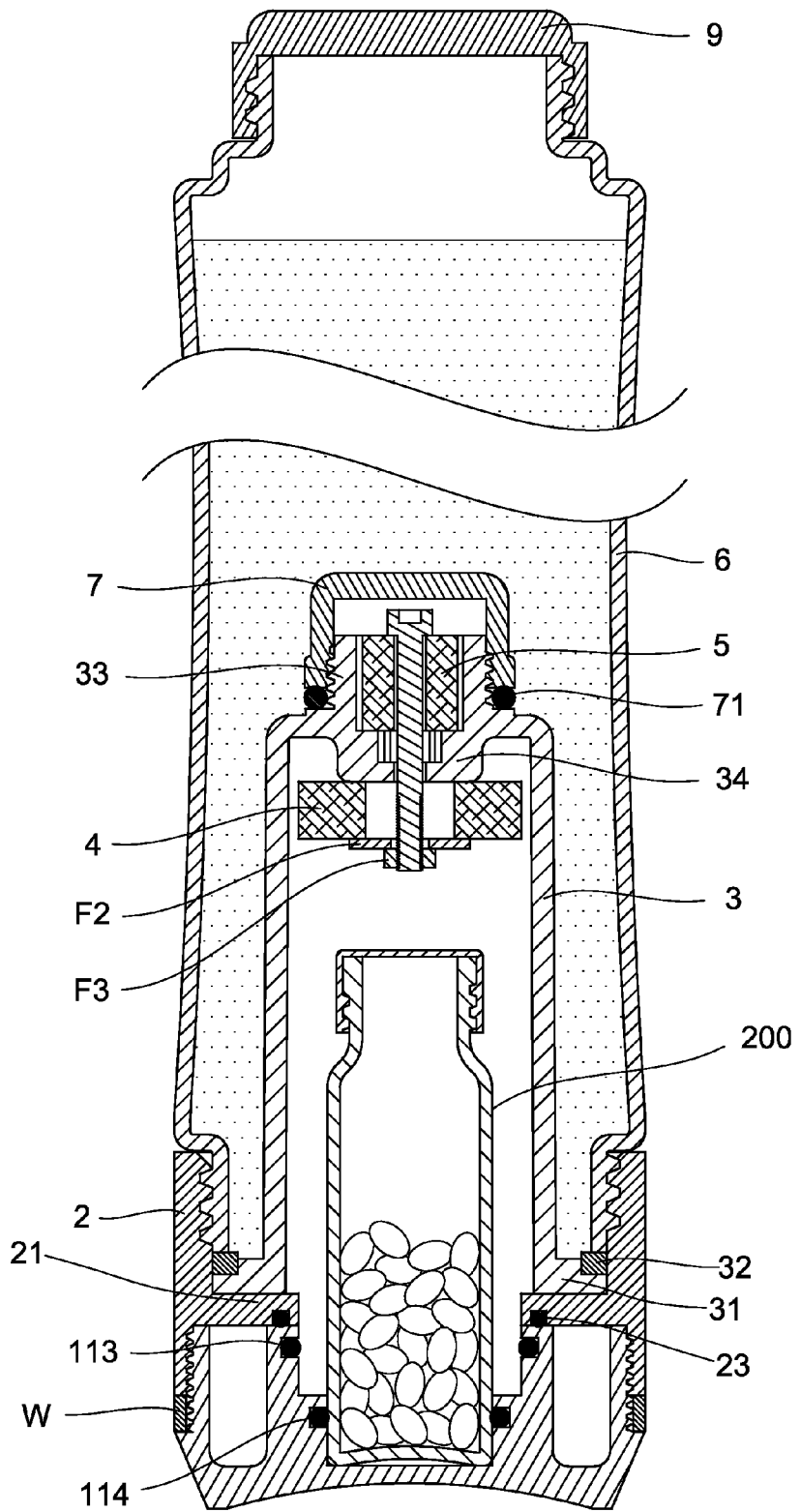
FIG. 6 is a cross-sectional view of an inner bottle body with smaller diameter of the first embodiment of the multi-function water treatment container for magnetizing water of the present invention.
Figure 7:
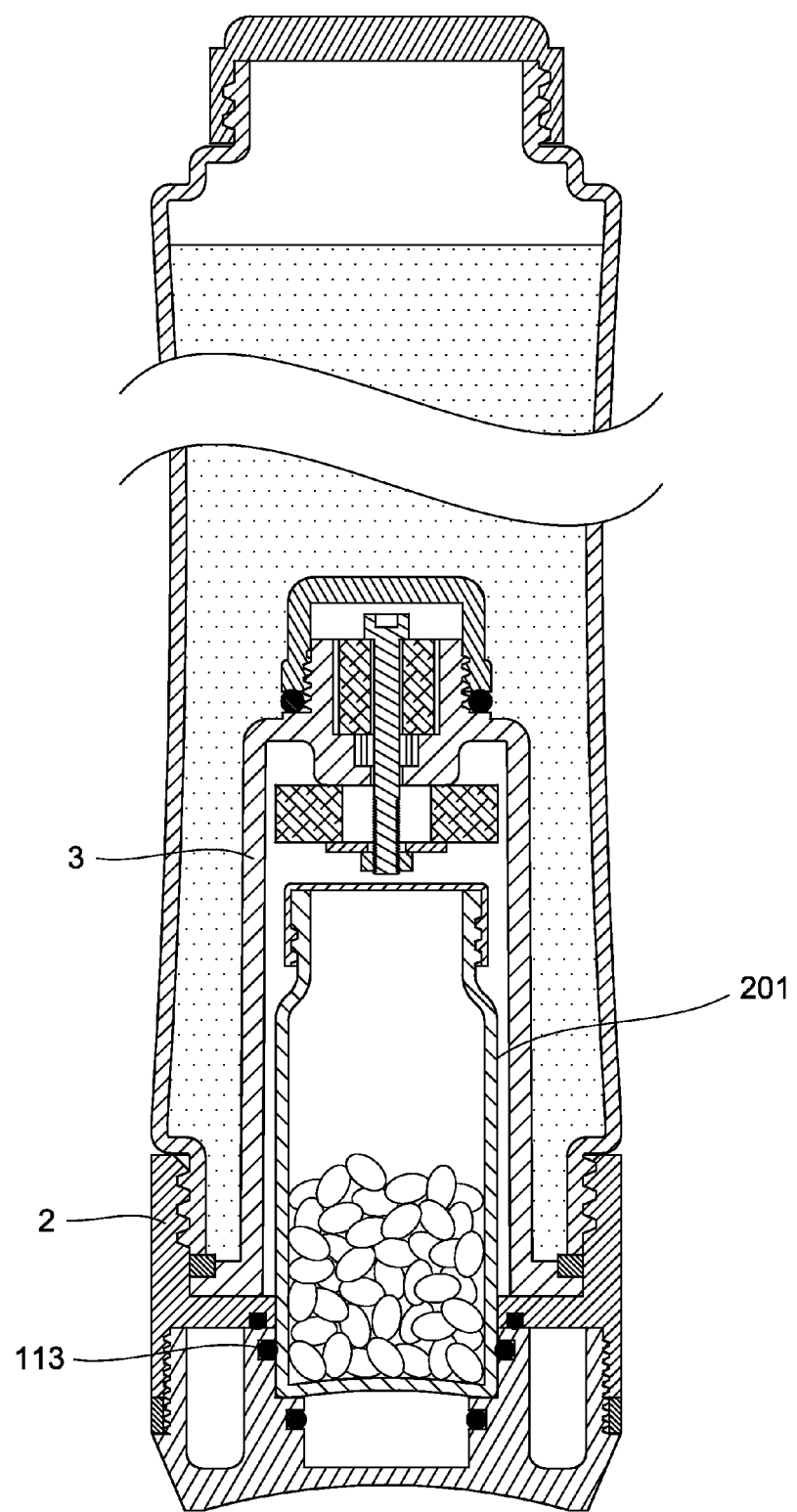
FIG. 7 is a cross-sectional view of an inner bottle body with larger diameter of the first embodiment of the multi-function water treatment container for magnetizing water of the present invention.
Figure 8:
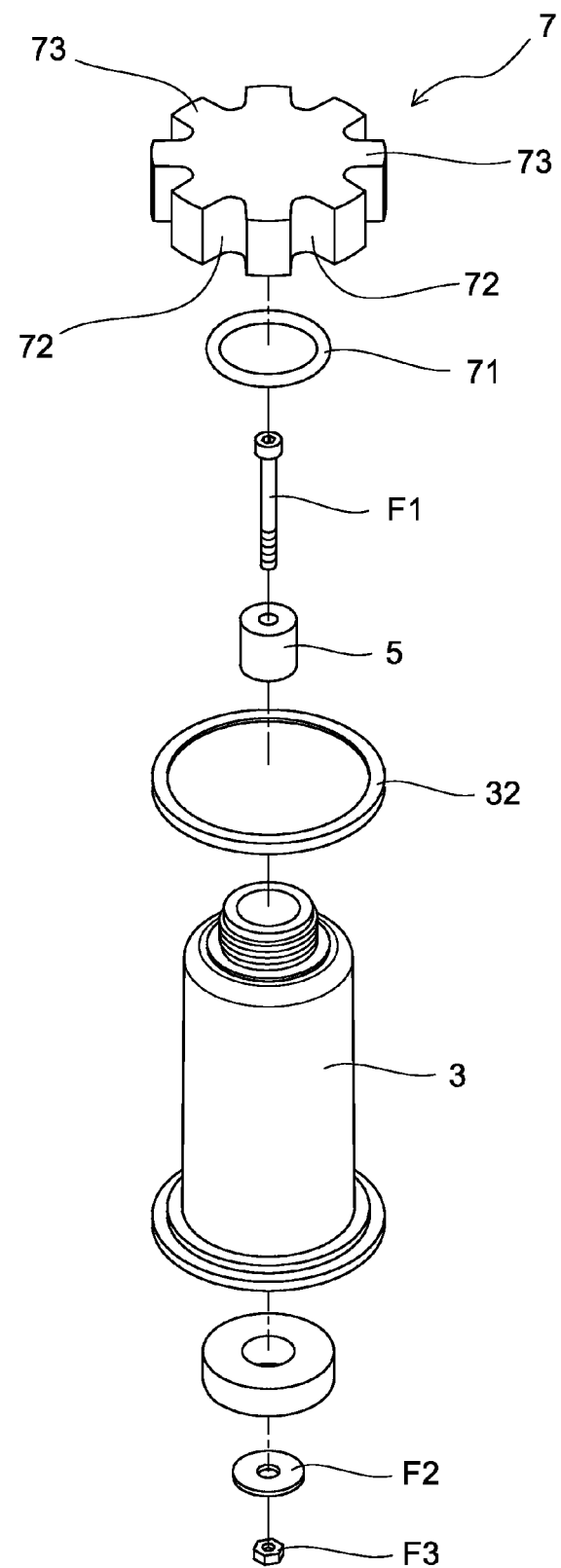
FIG. 8 is an exploded view of a second embodiment of the multi-function water treatment container for magnetizing water of the present invention.
Figure 9:
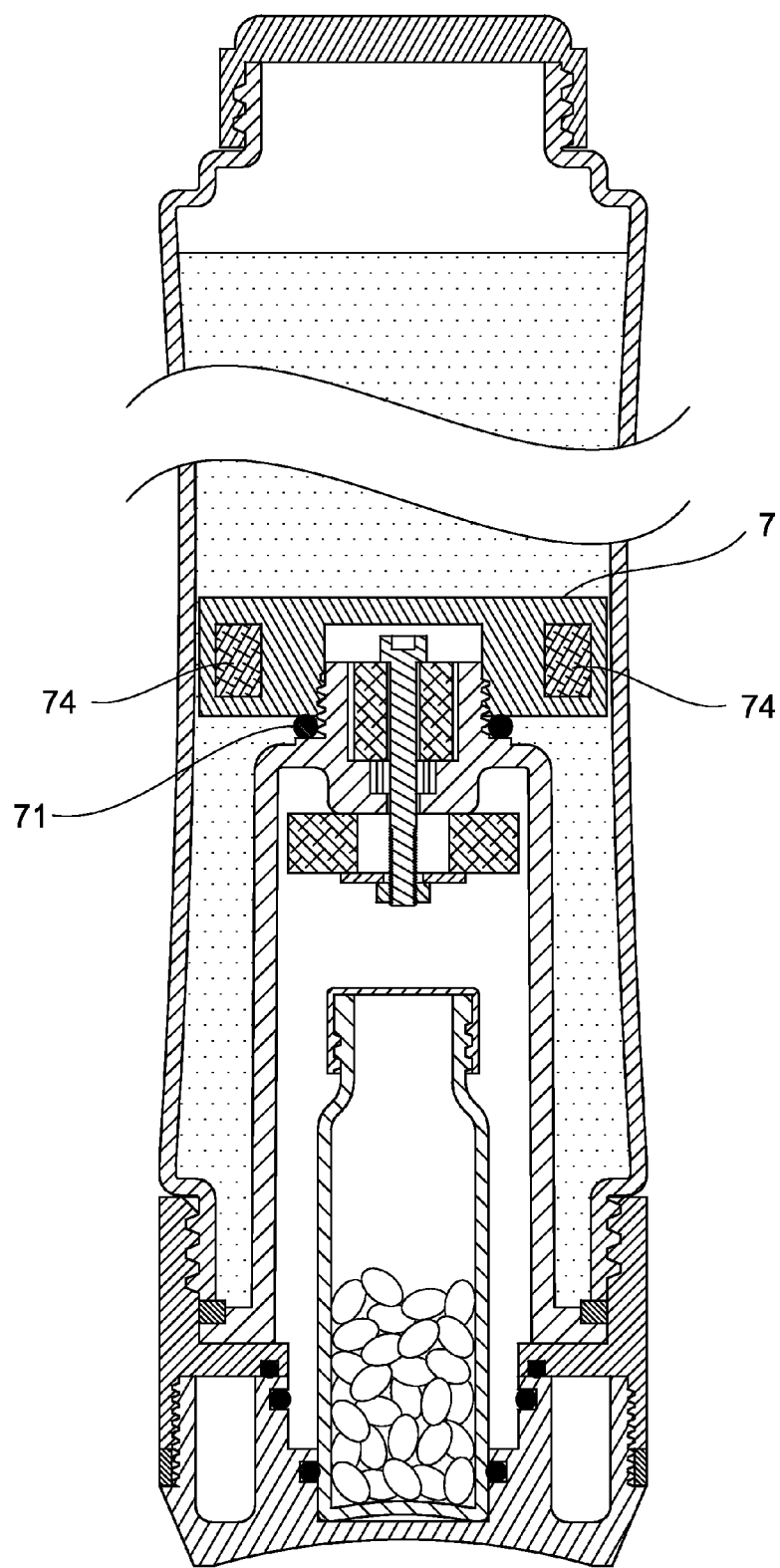
FIG. 9 is a cross-sectional view of the inner bottle body with smaller diameter of the second embodiment of the multi-function water treatment container for magnetizing water of the present invention.
Figure 10:
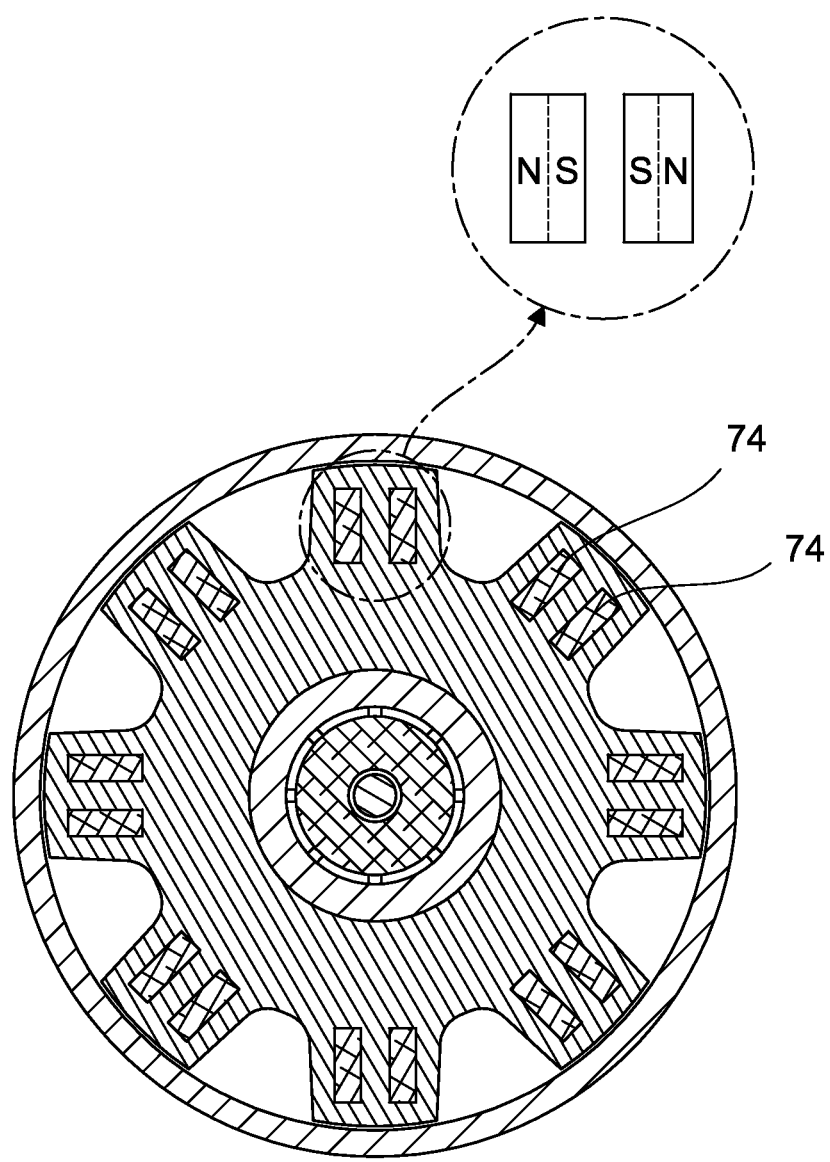
FIG. 10 is a cross-sectional view of a cap of the second embodiment of the multi-function water treatment container for magnetizing water of the present invention.

The base 1 has a connection groove 11 which is arranged thereinside for providing an inner bottle body 200 (or 201) to detachably fasten. The inner bottle body 200 (or 201) may be a medicine bottle or a bottle which is capable of receiving vitamins, coffee powder, tea powder, or other nutrition supplement liquids (such as enzyme or honey). The inner bottle body 200 (or 201) may be passing through the connection barrel 2 and located in the son bottle body 3. The connection groove 11 may be a step structure and at least has a first step groove portion 111 and a second step groove portion 112. A diameter of the first step groove portion 111 is larger than a diameter of the second step groove portion 112. The first step groove portion 111 is located above the second step groove portion 112. The first step groove portion 111 and the second step groove portion 112 may be provided for plugging and fastening the inner bottle body 200 (or 201) with various sizes. In FIG. 6, the inner bottler body 200 with a smaller size is plugged and fastened in the second step groove portion 112 with a smaller diameter. In FIG. 7, the inner bottler body 201 with a larger size is plugged and fastened in the first step groove portion 111 with a larger diameter.

In addition, a first step compression ring 113 and a second step compression ring 114 are respectively sleeved to the first step groove portion 111 and the second step grove portion 112 for providing the corresponding inner bottle body 200 or 201 to plugged and fastened tightly.

The connection barrel 2 has an inner convex ring 21 which is formed thereinside. The connection barrel 2 is located above the base 1 and detachably screwed with the base 1. A compression ring 23 is interposed between the inner convex ring 21 and the connection groove 11 of the base 1.

Furthermore, the multi-function water treatment container 100 may further comprise an outer bottom cover 12 and a marking ring W. The outer bottom cover 12 is covered to the bottom of the base 1. The marking ring W is rotatably sleeved to the base 1 and interposed between the connection barrel 2 and the outer bottom cover 12. A date scale 22 is marked at an outer surface of the connection barrel 2 which is adjacent to the marking ring W and a week scale W1 is marked at an outer surface of the marking ring W.

The son bottle body 3 has an outer convex ring 31 which is formed at bottom thereof. A bottom surface of the outer convex ring 31 is abutted against on the inner convex ring 21 of the connection barrel 2. A seal ring 32 is sleeved on the outer convex ring 31. The seal ring 32 is interposed between the outer convex ring 31 and the bottom ring potion 61. The son bottle body 3 is partially exposed above the connection barrel 2. A convex shoulder portion 33 is extended from an outer surface of the son bottle body 3 upwardly. And an abutting ring 34 is formed the convex shoulder portion 33 inwardly.

The first magnetic element 4 is arranged in the son bottle body 3, adjacent to the abutting ring 34 of the convex shoulder portion 33, and under the abutting ring 34.

The second magnetic element 5 is arranged in the convex shoulder portion 33 of the son bottle body 3 and located above the abutting ring 34. A fixing element F is passing through the second magnetic element 5, the abutting ring 34, and a first magnetic element 4 to fix together.

The fixing element F includes a screw bolt F1, a washer F2, and a screw nut F3. The screw bolt F1 is located above the second magnetic element 5 which is arranged in the convex shoulder portion 33 and passing through the second magnetic element 5, the abutting ring 34, and the first magnetic element 4 downwardly. The washer F2 is sleeved to the screw bolt F1 from the bottom of the first magnetic element 4. The screw nut F3 is located under the washer F2 and screwed with the screw bolt F1 so as to fasten the second magnetic element 5, the abutting ring 34, the first magnetic element 4, and the washer F2.

The mother bottle body 6 is located above the connection barrel 2 and detachably screwed with the connection barrel 2 with the bottom ring portion 61. The bottom ring portion 61 of the mother bottle body 6 is abutted against on the seal ring 32 to prevent the liquid in the mother bottle body 6 from leaking. The mother bottle body 6 may be covered the son bottle body 3, the first magnetic element 4, and the second magnetic element 5.

The inner bottle body 200 may be passing through the connection barrel 2 and located in the son bottle body 3. Therefore, the liquid in the mother bottle body 6 may be not leaked into a lower space of the son bottle body 3 due to the isolation of the son bottle body 3.

The cap 7 may be made by a material of stainless steel, food-grade plastic, or nano-gold fine ceramic. The cap 7 is sleeved to the convex shoulder portion 33 of the son bottle body 3 and located above the second magnetic element 5. An O-ring 71 is sleeved to a lower edge of the cap 7 so that the O-ring 71 for sealing is interposed between a bottom surface of the cap 7 and an outer surface of the son bottle body 3 which is adjacent to an outer edge of the convex shoulder portion 33 (shown as in FIGS. 4 to 7). A plurality of axial grooves 72 is spaced apart angularly and formed at an outer edge of the cap 7. A protruding portion 73 is formed between two adjacent axial grooves 72. The flow of the liquid (such as water) may be guided by each axial groove 72 so that the water molecules may be fined more easily. In order to make the effect of magnetizing water better, two third magnetic elements 74 may be sealed and arranged in each of the protruding portion 73. Two third magnetic elements 74 which are sealed in the same protruding portion 73 are arranged with the same S poles (S-S arrangement). Two third magnetic elements 74 which are sealed in the adjacent two protruding portions 73 respectively are arranged with the same N poles (N-N arrangement)(shown as in FIG. 10). Therefore, the liquid (such as water) which is flowed through each axial groove 72 may be magnetized due to the repulsion of N-N pole magnetic field.

The multi-function water treatment container 100 of the present invention may further comprise a bottle cover 9. The bottle cover 9 may be detachably screwed with a top portion of the mother bottle body 6.

In conclusion, the N, S poles of the first magnetic element 4 and the N, S poles of the second magnetic element 5 are corresponding to each other and a repelling magnetic field is generated. When shaking the multi-function water treatment container 100 of the present invention, the water molecules of the liquid (such as water) may be affected by magnetic waves with low frequencies to make the water become the magnetizing and resonating water. The water molecules may become finer. After being cut by the magnetic fields and vibrating with the frequencies, the activity of the water may be enhanced and the molecule arrangement may be more orderly. Furthermore, the oxygen content, the solubility, and the permeability of the water molecules are enhanced substantially so as to being absorbed more easily by human body. In other words, the magnetizing and resonating water may be quickly proceeded the physiological actions in organisms.

The son bottle body 3 may be made by a material of stainless steel, food-grade plastic, Borosilicate glass, or nano-gold fine ceramic. Taking the Borosilicate glass material with high quality for example, it is easy to clean and the objects which are received therein may be clearly seen. It is more convenient for users.

Besides, the inner bottle 200 (or 201) may be arranged and fastened in the son bottle body 3 so as to carry with the multi-function water treatment container 100 to prevent from forgetting to eat medicines.

The above mentioned seal ring 32 and the O-ring 71 may be made by the material of food-grade plastic.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A multi-function water treatment container for magnetizing water, at least comprising:
    a base, having a connection groove arranged thereinside for providing an inner bottle body to detachably fasten;
    a connection barrel, having an inner convex ring formed thereinside, the connection barrel is located above the base and detachably screwed with the base;
    a son bottle body, having an outer convex ring formed at bottom thereof, a bottom surface of the outer convex ring is abutted against on the inner convex ring of the connection barrel, a seal ring is sleeved on the outer convex ring, the son bottle body is partially exposed above the connection barrel, a convex shoulder portion is extended from an outer surface of the son bottle body upwardly, and an abutting ring is formed the convex shoulder portion inwardly;
    a first magnetic element, arranged in the son bottle body, adjacent to the abutting ring of the convex shoulder portion, and under the abutting ring;
    a second magnetic element, arranged in the convex shoulder portion of the son bottle body and located above the abutting ring, and a fixing element is passing through the second magnetic element, the abutting ring, and a first magnetic element to fix together;
    a cap, sleeved to the convex shoulder portion of the son bottle body and located above the second magnetic element, an O-ring is sleeved to a lower edge of the cap so that the O-ring is interposed between a bottom surface of the cap and an outer surface of the son bottle body adjacent to an outer edge of the convex shoulder portion; and
    a mother bottle body, located above the connection barrel and detachably screwed with the connection barrel, a bottom ring portion of the mother bottle body is abutted against above the seal ring, the mother bottle body is covered the son bottle body, the first magnetic element, and the second magnetic element;
    wherein the inner bottle body is passing through the connection barrel and located in the son bottle body.

2. The container claimed as claim 1, further comprising an outer bottom cover and a marking ring, the outer bottom cover is covered to the bottom of the base, the marking ring is rotatably sleeved to the base and interposed between the connection barrel and the outer bottom cover, a date scale is marked at an outer surface of the connection barrel adjacent to the marking ring, and a week scale is marked at an outer surface of the marking ring.

3. The container claimed as claim 1, further comprising a bottle cover, the bottle cover is detachably screwed with a top portion of the mother bottle body.

4. The container claimed as claim 1, wherein the connection groove is a step structure and at least has a first step groove portion and a second step groove portion, a diameter of the first step groove portion is larger than a diameter of the second step groove portion, the first step groove portion is located above the second step groove portion, and the first step groove portion and the second step groove portion are provided for plugging and fastening the inner bottle body with various sizes.

5. The container claimed as claim 1, wherein the son bottle body is made by a material of stainless steel, food-grade plastic, Borosilicate glass, or nano-gold fine ceramic.

6. The container claimed as claim 1, wherein the cap is made by a material of stainless steel, food-grade plastic, or nano-gold fine ceramic.

7. The container claimed as claim 1, wherein a plurality of axial grooves is spaced apart angularly and formed at an outer edge of the cap, and a protruding portion is formed between two adjacent axial grooves.

8. The container claimed as claim 7, wherein two third magnetic elements are arranged at each of the protruding portion.

9. The container claimed as claim 1, wherein the fixing element includes a screw bolt, a washer, and a screw nut, the screw bolt is located above the second magnetic element arranged in the convex shoulder portion and passing through the second magnetic element, the abutting ring, and the first magnetic element downwardly, the washer is sleeved to the screw bolt from the bottom of the first magnetic element, the screw nut is located under the washer and screwed with the screw bolt so as to fasten the second magnetic element, the abutting ring, the first magnetic element, and the washer.

10. The container claimed as claim 7, wherein the cap is made by a material of stainless steel, food-grade plastic, or nano-gold fine ceramic.

* * * * *